United States Patent
Kim

(10) Patent No.: US 9,278,697 B2
(45) Date of Patent: Mar. 8, 2016

(54) VEHICLE RUNNING CONTROL APPARATUS AND METHOD

(71) Applicant: Mando Corporation, Pyeongtaek-si (KR)

(72) Inventor: Seong Joo Kim, Seongnam-si (KR)

(73) Assignee: MANDO CORPORATION, Pyeongtaek-Si (KR)

(*) Notice: Subject to any disclaimer, the term of this patent is extended or adjusted under 35 U.S.C. 154(b) by 16 days.

(21) Appl. No.: 14/272,467

(22) Filed: May 7, 2014

(65) Prior Publication Data
US 2014/0336877 A1 Nov. 13, 2014

(30) Foreign Application Priority Data

May 8, 2013 (KR) .................. 10-2013-0051709

(51) Int. Cl.
| | | |
|---|---|---|
| *B60W 10/20* | (2006.01) | |
| *B60W 10/02* | (2006.01) | |
| *B60W 40/114* | (2012.01) | |
| *B60W 10/04* | (2006.01) | |
| *B62D 15/02* | (2006.01) | |
| *B60W 10/06* | (2006.01) | |
| *B60W 30/02* | (2012.01) | |

(52) U.S. Cl.
CPC ............ *B60W 40/114* (2013.01); *B60W 10/04* (2013.01); *B60W 10/06* (2013.01); *B60W 10/20* (2013.01); *B60W 30/02* (2013.01); *B62D 15/025* (2013.01); *B60W 2510/0604* (2013.01); *B60W 2510/0638* (2013.01); *B60W 2520/28* (2013.01); *B60W 2520/406* (2013.01); *B60W 2720/406* (2013.01)

(58) Field of Classification Search
CPC .............................. B60W 10/04; B60W 10/20
USPC ........................................................... 701/41
See application file for complete search history.

(56) References Cited

U.S. PATENT DOCUMENTS

| | | | |
|---|---|---|---|
| 2012/0226416 A1* | 9/2012 | Lee .................................. | 701/42 |
| 2013/0179015 A1* | 7/2013 | Liang et al. ..................... | 701/22 |

* cited by examiner

*Primary Examiner* — Nga X Nguyen
(74) *Attorney, Agent, or Firm* — Ladas & Parry, LLP

(57) ABSTRACT

The present disclosure relates to a vehicle running control apparatus and a vehicle running control method. The invention calculates a compensation torque for preventing the pulling of the vehicle by reflecting the speed difference between the driving wheel and the driven wheel of the vehicle, thereby enabling the vehicle to run more stably as compared to the prior art.

8 Claims, 5 Drawing Sheets

VEHICLE RUNNING CONTROL APPARATUS AND METHOD

CROSS-REFERENCE TO RELATED APPLICATION

This application claims priority from and the benefit under 35 U.S.C. §119(a) of Korean Patent Application No. 10-2013-0051709, filed on May 8, 2013, which is hereby incorporated by reference for all purposes as if fully set forth herein.

BACKGROUND OF THE INVENTION

1. Field of the Invention

The present invention relates to a vehicle running control technique.

2. Description of the Prior Art

FIG. 1 is a view schematically illustrating a cause of torque steer occurrence in a conventional vehicle.

In a conventional vehicles, an engine is positioned in the front of the vehicle and a power train leans to one of left and right drive shaft 15a and 15b as shown in FIG. 1. Due to such a layout, in such a conventional vehicle, the lengths of left and right drive shafts 15a and 15b may become different from each other.

When drive torques are applied to the left and right drive shafts 15a and 15b in such a vehicle, different moments are applied to knuckles of left and right wheel sides 10a and 10b of the vehicles, respectively. Due to the difference of the moments, uneven torque is applied to the left and right wheel sides 10a and 10b and, thus, acts as a force that steers the vehicle.

That is, a phenomenon which causes the vehicle to lean to the longer drive shaft occurs.

Such a phenomenon is referred to as a torque steer. At a low speed state where the engine power is not high, the force that steers the vehicle is also small and, thus, the phenomenon is not remarkable. However, when suddenly starting the vehicle from a stopped state while driving force is being increased or when suddenly accelerating the vehicle while the vehicle is running, the torque steer phenomenon occurs and the vehicle is driven in a state where the vehicle body leans to one side.

Conventionally, it has been proposed to reduce drive torque at the time of initially staring the vehicle in order to prevent such a torque steer phenomenon. However, there is a problem in that, when the driving torque is reduced, the acceleration performance of the vehicle is degraded.

SUMMARY OF THE INVENTION

Considering this background, an aspect of the present invention is to provide a vehicle running control apparatus and a vehicle running control method which are capable of preventing occurrence of a pulling phenomenon of a vehicle at the time of sudden start or sudden acceleration.

Another aspect of the present invention is to provide a vehicle running control apparatus and a vehicle running control method in which a compensation torque for preventing torque steering by reflecting a speed difference between a driving wheel and a driven wheel at the time of sudden start or sudden acceleration of the vehicle, so that the vehicle may run stably.

In accordance with an aspect of the present invention, there is provided a vehicle running control apparatus including: a drive control unit configured to control a drive torque output from an engine of a vehicle; a pulling compensation control unit configured to a pulling compensation torque to compensate pulling of the vehicle which occurs when the drive torque output is transferred to left and right drive shafts; and an EPS control unit configured to generate a steering auxiliary power based on the pulling compensation torque transferred from the pulling compensation control unit such that the steering auxiliary power is transferred to a wheel of the vehicle.

In accordance with another aspect of the present invention, there is provided a vehicle running control method including: receiving a drive torque information output from an engine of a vehicle; calculating a pulling compensation torque for the vehicle based on the drive torque information; and driving a steering motor based on the calculated pulling compensation torque such that a steering auxiliary power is transferred to a wheel of the vehicle.

According to the present invention as described above, the pulling phenomenon occurring at the time of sudden start or sudden acceleration of the vehicle may be minimized such that running stability of the can be enhanced.

In addition, the compensation torque for preventing the pulling of the vehicle may be calculated by reflecting the speed difference between the driving wheel and the driven wheel of the vehicle such that a proper compensation torque of which the magnitude is neither excessive nor insufficient can be transferred to the vehicle wheels.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
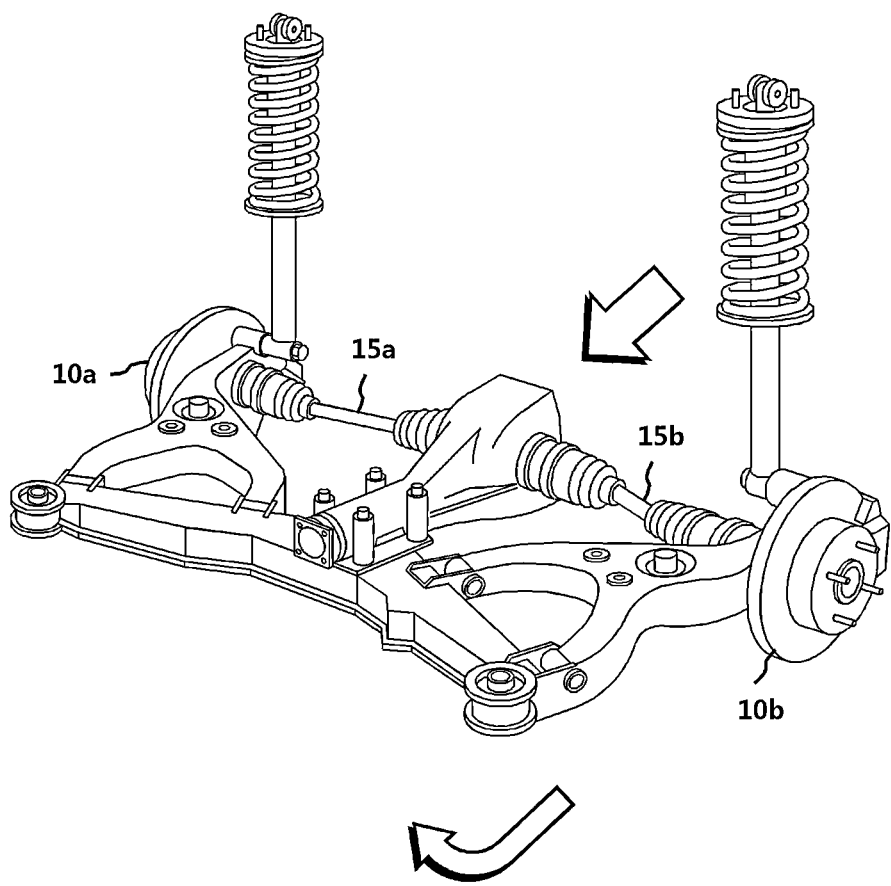
FIG. 1 is a perspective view illustrating drive shafts of a conventional vehicle.

Hereinafter, exemplary embodiments of the present invention will be described with reference to the exemplary drawings. In the following description, the same elements will be designated by the same reference numerals even if they are shown in different drawings. Further, in the following description of the present invention, a detailed description of known functions and configurations incorporated herein will be omitted when it may make the subject matter of the present invention rather unclear.

Figure 2:
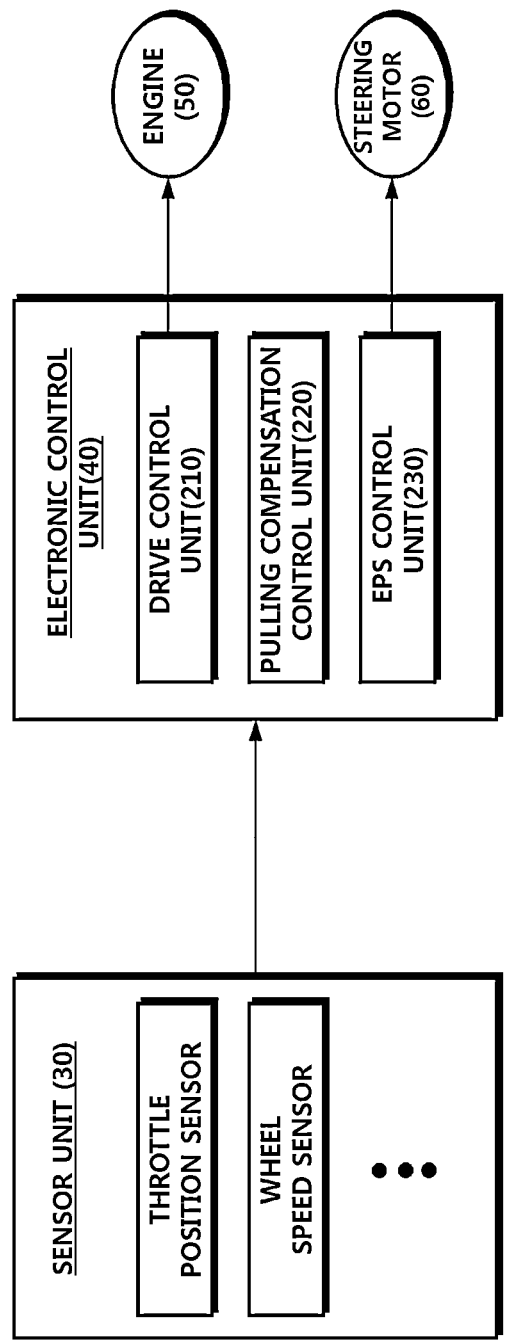
FIG. 2 is a block diagram illustrating a configuration of a vehicle running control apparatus according to an exemplary embodiment of the present invention.

FIG. 2 is a block diagram illustrating a configuration of a vehicle running control apparatus according to an exemplary embodiment of the present invention.

Referring to FIG. 2, a vehicle running control apparatus according to an exemplary embodiment of the present invention includes a sensor unit 30 including a plurality of sensors mounted on a vehicle configured to sense an operating state of the vehicle, and an electronic control unit 40 configured to generate a control signal that controls the running of the vehicle based on status information received from the sensor unit 30 and transfer the control signal to each component of the vehicle.

The electronic control unit 40 includes a drive control unit 210 configured to control a drive torque output from a vehicle engine 50, and an EPS control unit 230 configured to cause a steering auxiliary power generated from a steering motor 60 to be transferred to vehicle wheels.

In particular, the electronic control unit 40 according to the present exemplary embodiment includes a pulling compensation control unit 220 configured to calculate a pulling compensation torque when it is determined that pulling may occur in the vehicle when the drive torque output from the engine 50 is transferred to the left and right drive shafts of the vehicle so that the pulling of the vehicle can be compensated. The pulling compensation torque calculated by the pulling compensation control unit 220 is transferred to the EPS control unit 230 so as to make the steering motor 60 generate a steering auxiliary power.

Figure 3:
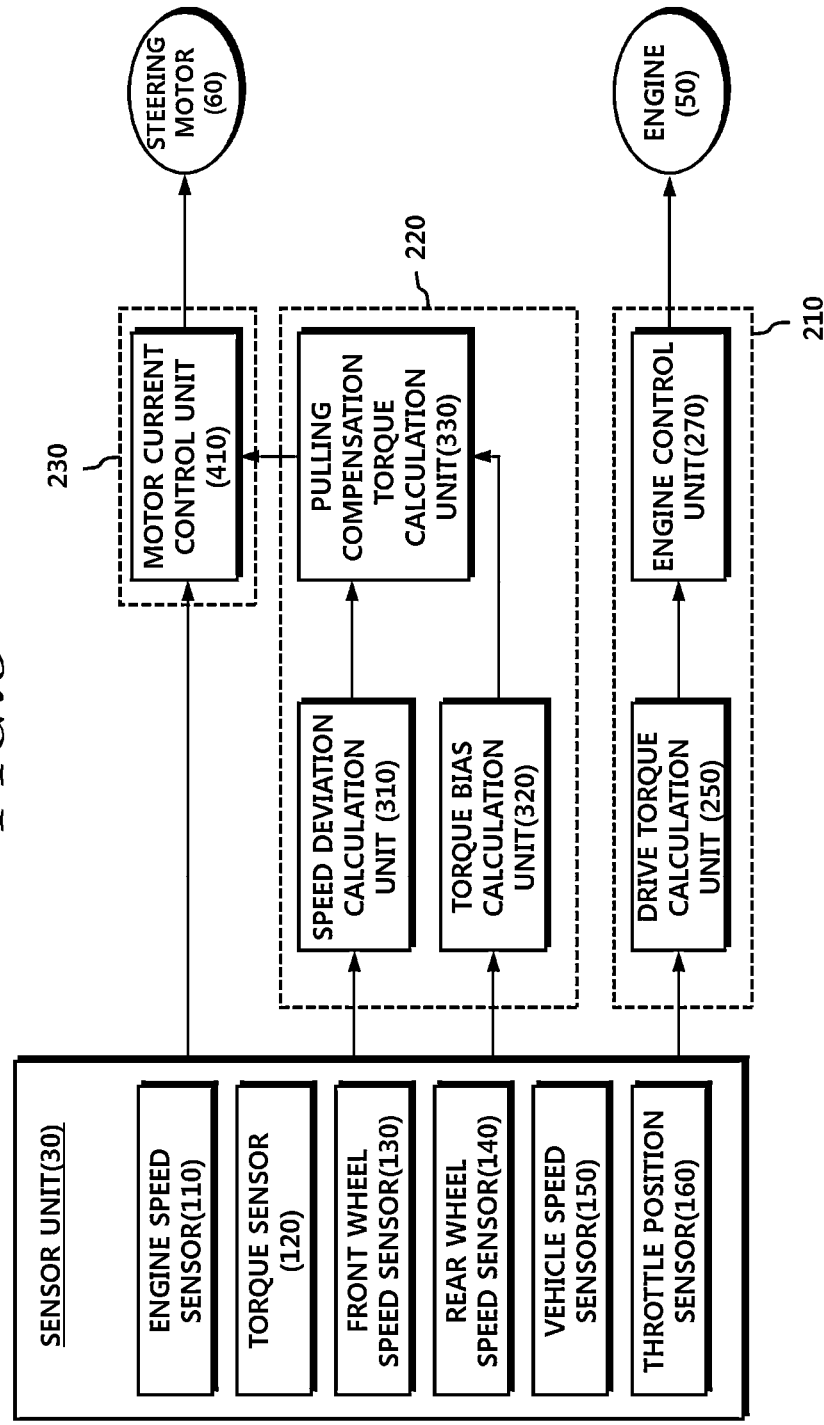
FIG. 3 is a block diagram illustrating the configuration of the vehicle running control apparatus according to the exemplary embodiment of the present invention in more detail.

FIG. 3 is a block diagram illustrating the configuration of the vehicle running control apparatus according to the exemplary embodiment of the present invention in more detail.

Referring to FIG. 3, the vehicle running control apparatus of the present invention includes a sensor unit 30 including a plurality of sensors mounted on a vehicle configured to sense an operating state of the vehicle, and an electronic control unit 40 configured to generate a control signal that controls the running of the vehicle based on status information received from the sensor unit 30 and transfer the control signal to each component of the vehicle, as described above.

The sensor unit 30 includes an engine speed sensor 110, a torque sensor 120, a vehicle speed sensor 150, and a throttle position sensor 160. The vehicle speed sensor 150 senses the vehicle speed according to the running of the vehicle, and generates a vehicle speed sensing signal. The throttle position sensor 160 is installed in a throttle valve of the vehicle to sense an opening amount according to an opening value of the corresponding throttle valve and an opening speed value and to generate a throttle amount sensing signal and an opening speed sensing signal. The torque sensor 120 senses a steering torque from the rotation of the steering wheel by a driver. The engine speed sensor 110 detects the number of rotations of a rotation shaft of the engine and generates an engine speed signal.

In addition, the sensor unit 30 includes a wheel speed sensor configured to sense a wheel speed of a vehicle wheel. The wheel speed sensor may be constituted with a front wheel speed sensor 130 mounted on the front wheel side of the vehicle to sense the rotation speed of the front wheels and outputs a sensing signal according to the rotation speed of the front wheels, and a rear wheel speed sensor 140 mounted on the rear wheel side of the vehicle to sense the rotation speed of the rear wheels and outputs a sensing signal according to the rotation speed of the rear wheels.

The front wheel speed sensor 130 may be mounted on each of left and right front wheels. However, the present invention is not limited to this and the front wheel speed sensor 130 may be mounted only one of the left and right front wheels to sense the rotation speed.

The rear wheel speed sensor 140 may also be mounted on each of left and right rear wheels. However, the present invention is not limited to this and the rear wheel speed sensor 140 may be mounted only one of the left and right rear wheels to sense the rotation speed.

The drive control unit 210 may include: a drive torque calculation unit 250 configured to calculate a drive torque to be output from the engine 50 based on information received from any one of the throttle position sensor 160, the vehicle speed sensor 150, and the engine speed sensor 110; and an engine control unit 270 configured to control the operation of the engine 50 such that a torque is output from the engine 50 by the drive torque calculated by the drive torque calculation unit 250.

The EPS control unit 230 includes a motor current control unit 410, and the pulling compensation control unit 220 includes a speed deviation calculation unit 310, a torque bias calculation unit 320, and a pulling compensation torque calculation unit 330.

The motor current control unit 410 controls a current applied to the steering motor 60 according to torque information received from the torque sensor 120 and/or information received from the vehicle speed sensor 150 such that a steering auxiliary power corresponding to the operation of the steering wheel can be generated by the steering motor 60. In the running control apparatus according to an exemplary embodiment of the present invention, the motor current control unit 410 may apply the current to the steering motor 60 such that steering can be performed in the vehicle wheels even if the steering wheel is not operated.

As the drive torque output from the vehicle engine 50 is applied to the vehicle wheels through the drive shafts, respectively, the torque bias calculation unit 320 calculates a torque bias applied to a steering system.

More specifically, the drive torque output from the engine 50 is transferred to the left and right vehicle wheels through the left and right drive shafts, thereby rotating the wheels. At this time, even if the drive torques of the same magnitude are applied to one side ends of the drive shafts connected to the engine 50 side, a difference will occur between the torques transferred to the left front wheel and the right front wheel due to the difference in length between the left drive shaft and the right drive shaft.

At this time, each front wheel is mechanically connected with the steering system that includes, for example, a rack bar, a steering shaft, and a steering wheel. Thus, when there is a difference between the drive torques transferred to the respective front wheels, a force generated by the difference between the drive torques may also be transferred to the steering system. The force applied to the steering system due to the difference of the drive torques may be referred to as a torque bias with respect to the driver.

The torque bias calculation unit 320 is configured to calculate the torque bias applied to the steering system due to the difference between the uneven torques applied to the vehicle wheels as described above. Specifically, the difference between the torque value transferred to the left front wheel side and the torque value transferred to the right front wheel side based on the length values of the left and right drive shafts stored in advance therein and drive torque output from the drive torque calculation unit 250, and the torque bias may be calculated from the calculated difference between the torques.

The torque bias calculation unit 320 transfers the calculated torque bias to the pulling compensation torque calculation unit 330, and the pulling compensation torque calculation unit 330 calculates a pulling compensation torque for compensating the transferred torque bias.

When the pulling compensation torque calculated by the pulling compensation torque calculation unit 330 is transferred to the motor current control unit 410 and, thus, a steering auxiliary power corresponding to the pulling compensation torque is generated by the steering motor 60, the steering auxiliary power is transferred to the vehicle wheels through the rack bar connected with the steering motor 60.

Accordingly, when the force generated due to the difference between the lengths of the drive shafts acts on the vehicle wheels as a force to steer the vehicle wheels, the steering auxiliary power is transferred to the vehicle wheels so that the force to steer the vehicle wheels can be counteracted by the steering auxiliary power. Therefore, the vehicle can stably run without suffering from the pulling phenomenon.

At this time, the steering auxiliary power may be generated in consideration not only the torque bias calculated by the torque bias calculation unit 320 but also the wheel speed deviation between the front wheels and the rear wheels.

When a large driving force is suddenly applied to the front wheel side of the vehicle as the vehicle is suddenly started or suddenly accelerated, slip may occur in the front wheels. When the slip occurs in any one of the left and right front wheels when the steering auxiliary power based on the torque bias calculated by the torque bias calculation unit 320, the wheel where slip occurs tends to rotate more than the other wheel side.

More specifically, referring to FIG. 1, the fact that slip occurs means that the friction between the ground and the corresponding wheel is reduced. In FIG. 1, when the pulling phenomenon occurs on the left side since the length of the left drive shaft 15a is longer than that of the right drive shaft 15b, the pulling compensation torque calculation unit 330 according to an exemplary embodiment of the present invention may calculate a pulling compensation torque based on the torque bias transferred from the torque bias calculation unit 320. Thus, the steering motor 60 may generate a steering auxiliary power such that the front wheels 10a and 10b are steered by a set angle in the right direction. At this time, when slip occurs on the front wheel side, the friction between the front wheels and the ground is reduced. Thus, the torque steer phenomenon occurs to be less than a set amount. As a result, when the pulling compensation torque to be applied under the situation where no slip occurs is applied in this state, a problem may arise in that excessive compensation may be applied.

Considering this, in the running control apparatus according to an exemplary embodiment of the present invention, the pulling compensation control unit 220 includes a speed deviation calculation unit 310 configured to determine occurrence of slip and the level of the slip, and the pulling compensation torque calculation unit 330 applies a compensation gain according to the rotation speed deviation transferred from the speed deviation calculation unit 310 to the compensation torque calculated based on the torque bias so as to calculate a pulling compensation torque to be transferred to the motor current control unit 410.

The speed deviation calculation unit 310 calculates a rotation speed deviation (wheel speed deviation) base on the rotation speed information of the front and rear wheels at the time of driving the vehicle. That is, in a front-wheel drive vehicle, the drive torque generated from the engine 50 is only applied to the front wheels and the rear wheels follow the movement of the front wheels. Thus, when on slip occurs, the rotation speed of the front wheels and the rotation speed of the rear wheels have the same value within the margin of error. However, when the rotation speed of the front wheels is higher than the rotation speed of the rear wheels in excess of the margin of error, it may be determined that slip occurs in the front wheels and a determination can be made on the amount of slip according to the deviation. That is, when the rotation speed deviation is large, it may be determined that a significant amount of slip occurs.

Accordingly, the speed deviation calculation unit 310 receives the rotation speed information of the front wheels from the front wheel speed sensor 130 and receives the rotation speed information of the rear wheels from the rear wheel speed sensor 140 to calculate the rotation speed deviation (wheel speed deviation) from each piece of the rotation speed information.

In addition, the pulling compensation torque calculation unit 330 calculates a pulling compensation torque based on the torque bias calculated by the torque bias calculation unit 320 and the rotation speed deviation calculated by the speed deviation calculation unit 310 and transfers the calculated pulling compensation torque value to the motor current control unit 410.

When it is determined that pulling has occurred in the vehicle, the pulling compensation torque calculation unit 330 calculates a pulling compensation torque for preventing the pulling.

As a reference for determining the occurrence of pulling, the pulling compensation control unit 220 may use at least one of drive torques and a deviation therebetween which are calculated by the drive torque calculation unit 250, a torque bias calculated by the torque bias calculation unit 320, and an engine speed received from the engine speed sensor 110.

That is, when the calculated drive torque is equal to or higher than a pre-set reference value or the deviation between drive torques is equal to or larger than a pre-set reference value, when the torque bias is equal to or larger than a pre-set reference value, or when the engine speed is equal to or higher than a pre-set reference value, the pulling compensation control unit 220 may determine that it is in a state where pulling may occur, and, thus, may allow a steering auxiliary power corresponding to the pulling compensation torque to be applied to the front wheels of the vehicle.

When it is determined that there is a deviation between the rotation speed of the front wheels and the rotation speed of the rear wheels which are transferred from the wheel speed sensors 130 and 140 in calculating the pulling compensation torque, the pulling compensation torque calculation unit 330 may determine that slip has occurred by the wheel speed deviation calculated by the speed deviation calculation unit 310 and may calculate a slip-compensated pulling compensation torque based on a slip compensation torque map stored in advance therein.

Figure 4:
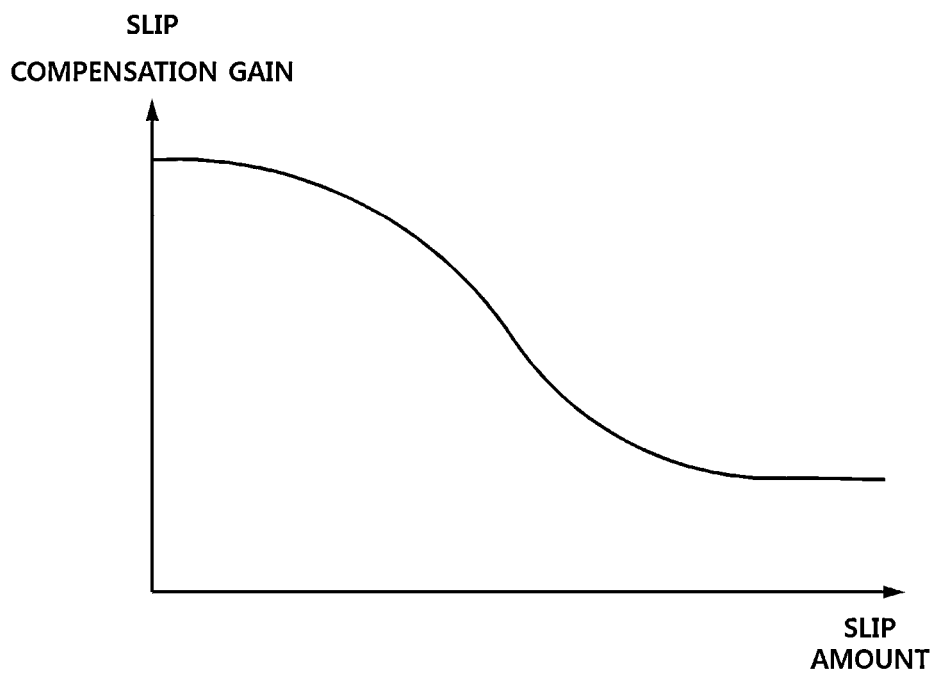
FIG. 4 is a graph representing a compensation map of a pulling compensation torque calculation unit according to an exemplary embodiment of the present invention.

FIG. 4 is a graph representing a compensation map of a pulling compensation torque calculation unit according to an exemplary embodiment of the present invention.

Referring to FIG. 4, according to a compensation map (slip compensation torque map) of the pulling compensation torque calculation unit 330 according to an exemplary embodiment of the present invention, a slip compensation gain corresponding to a wheel speed deviation of vehicle wheels may be set. The slip compensation gain is a value for reflecting an influence by the slip to the pulling compensation torque generated according to the deviation between the drive torques. When no slip occurs, the pulling compensation torque calculated based on the torque bias may be transferred to the motor current control unit 410 as it is, and when slip has occurred, the pulling compensation torque calculated based on the torque basis may be reduced according to the slip amount and then the reduced pulling compensation torque may be transferred to the motor current control unit 410.

As described above, when slip has occurred in the driving wheels (front wheels in a case of a front-wheel drive vehicle), it may be determined that the friction between a ground where the driving wheels are in contact and the driving wheels has been reduced. Thus, when the pulling compensation torque calculated based on a torque bias is "A", the driving wheels can be steered such that the pulling of the vehicle can be sufficiently prevented, even if a torque smaller than "A" is transferred to the motor current control unit 410 as a pulling compensation torque.

In consideration of this an exemplary embodiment of the present invention uses a slip compensation gain. Specifically, the pulling compensation torque calculation unit 330 calculates a pulling compensation torque corresponding to "A" based on the torque bias, and when a slip compensation gain "α" is drawn according to a rotation speed deviation, the pulling compensation torque calculation unit 330 applies the slip compensation gain to the pulling compensation torque corresponding to "A" to calculate "αA". At this time, "αA" is smaller than "A", and the finally calculated "αA" will be the pulling compensation torque to be transferred to the motor current control unit 410.

In the slip compensation torque map, the slip compensation gain value is set in such a manner that as the rotation speed deviation value is increased, the slip compensation gain value is reduced since it is determined that a significant amount of slip has occurred, and when the rotation speed deviation value is equal to or larger than a pre-set rotation speed deviation value, the slip compensation gain value is maintained constantly.

Figure 5:
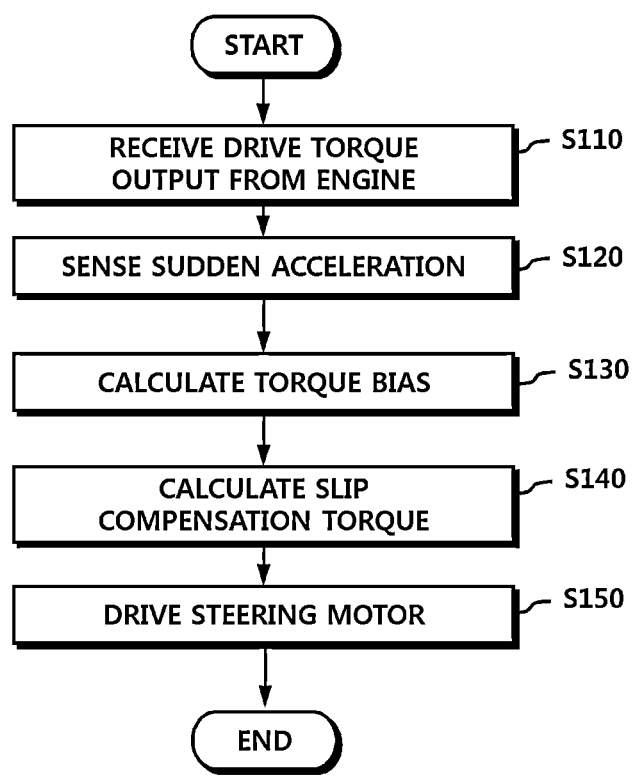
FIG. 5 is a flowchart illustrating a vehicle running control method according to an exemplary embodiment of the present invention.

FIG. 5 is a flowchart illustrating a vehicle running control method according to an exemplary embodiment of the present invention.

Referring to FIG. 5, according to a vehicle running control method according to an exemplary embodiment of the present invention, first, drive torque information calculated to be output from the vehicle engine is received from the drive torque calculation unit 250 (S110).

The pulling compensation control unit 220 may determine whether a pulling phenomenon may occur in the vehicle due to sudden start or sudden acceleration (S120), when it is determined that the pulling phenomenon may occur, the torque bias calculation unit 320 calculates a torque bias based on a deviation between drive torques applied to respective wheels through the left and right drive shafts when the drive torque output from the engine 50 is transferred to each of the left and right drive shafts (S130).

At this time, the pulling compensation control unit 220 may determine whether the pulling phenomenon occurs based at least one information item of drive torques and a deviation therebetween which are a calculated by the drive torque calculation unit 250, a torque bias, and an engine speed received form the engine speed sensor 110 (S120).

The speed deviation calculation unit 310 receives rotation speed information for the front wheels and rear wheels of the vehicle to calculate a deviation between the rotation speed of the front wheels and the rotation speed of the rear wheels, and the pulling compensation torque calculation unit 330 calculates a pulling compensation torque based on the torque bias and the rotation speed deviation. The pulling compensation torque calculation unit 330 may calculate the pulling compensation torque based on the torque bias calculated by the torque bias calculation unit 320 and finally calculate the pulling compensation torque by applying a slip compensation gain according to the rotation speed deviation to calculated pulling compensation torque (S140).

The pulling compensation torque finally calculated in step S140 is transferred to the motor current control unit 410, and the motor current control unit 410 controls the driving of the steering motor 60 by applying a current to the steering motor 60 such that the steering 60 may generate a steering auxiliary power corresponding to the pulling compensation torque (S150).

The steering auxiliary power generated by the steering motor 60 is transferred to the wheels through the rack bar such that the wheels are steered in a direction counteracting the pulling of the vehicle.

Although the exemplary embodiments of the present invention have been described for illustrative purposes, those skilled in the art will appreciate that various modifications and substitutions are possible, without departing from the scope and spirit of the invention as disclosed in the accompanying claims. Therefore, the exemplary embodiments disclosed in the present invention are intended to illustrate the scope of the technical idea of the present invention, and the scope of the present invention is not limited by the exemplary embodiments.

What is claimed is:

1. A vehicle running control apparatus comprising:
   A drive controller configured to control a drive torque output from an engine of a vehicle;
   A pulling compensation controller configured to calculate a pulling compensation torque based on at least one of a slip compensation torque map, a rotation speed deviation and torque bias to compensate pulling of the vehicle which occurs when the drive torque output is transferred to left and right drive shafts; and
   An EPS controller configured to generate a steering auxiliary power based on the pulling compensation torque such that the steering auxiliary power is transferred to a wheel of the vehicle;
   Wherein the pulling compensation controller includes:
      A torque bias calculator configured to calculate the torque bias based on a deviation between drive torques which is generated when the drive torque output from the engine of the vehicle is transferred to the left and right drive shafts;
      A speed deviation calculator configured to receive rotation speed information of the front wheels and the rear wheels of the vehicle from a wheel speed sensor and calculate the rotation speed deviation from each piece of the received rotation speed information; and
      A pulling compensation torque calculator configured to calculate the pulling compensation torque based on the calculated torque bias and rotation speed deviation such that the steering auxiliary power is generated.

2. The vehicle running control apparatus of claim 1, wherein the pulling compensation torque calculator calculates the pulling compensation torque to counteract the torque bias calculated by the torque bias calculation unit.

3. The vehicle running control apparatus of claim 1, wherein the slip compensation torque map is set in such a manner that a slip compensation gain corresponding to the rotation speed deviation value is set and that the slip compensation gain decreases as the rotation speed deviation value increases and when the rotation speed deviation value is equal to or larger than a pre-set rotation speed deviation value, the slip compensation gain is maintained constantly.

4. The vehicle running control apparatus of claim 1, wherein, when the torque bias is equal to or higher than a pre-set reference value or when the engine speed received from the sensor is equal to or higher than a pre-set reference value, the pulling compensation controller determines that pulling occurs in the vehicle and calculates the pulling compensation torque.

5. A vehicle running control method comprising:

Receiving a drive torque information output from an engine of a vehicle;

Calculating a pulling compensation torque for the vehicle based on the drive torque information by using at least one of a slip compensation torque map, a rotation speed deviation and torque bias; and Driving a steering motor based on the calculated pulling compensation torque such that a steering auxiliary power is transferred to a wheel of the vehicle;

Wherein the calculating of the pulling compensation torque includes:

Receiving rotation speed information for front wheels and rear wheels of the vehicle to calculate the rotation speed deviation between the rotation speed of the front wheels and the rotation speed of the rear wheels, Wherein the calculating the pulling compensation torque comprises:

calculating the torque bias based on deviation between drive torques which is generated when the drive torque output from the engine of the vehicle is transferred to the left and right drive shafts;

calculating the pulling compensation torque based on the calculated torque bias and the rotation speed deviation such that the steering auxiliary power is generated.

6. The vehicle running control method of claim 5, wherein the calculating the pulling compensation torque based on the calculated torque bias and the rotation speed deviation calculates the pulling compensation torque to counteract the torque bias.

7. The vehicle running control method of claim 5, wherein the slip compensation torque map is set in such a manner that a slip compensation gain corresponding to the rotation speed deviation value is set and that the slip compensation gain decreases as the rotation speed deviation value increases and when the rotation speed deviation value is equal to or larger than a pre-set rotation speed deviation value, the slip compensation gain is maintained constantly.

8. The vehicle running control method of claim 5, wherein the calculating the pulling compensation torque comprises, when the torque bias is equal to or higher than a pre-set reference value or when the engine speed received from the sensor is equal to or higher than a pre-set reference value, determining that pulling occurs in the vehicle and calculates the pulling compensation torque.

\* \* \* \* \*